United States Patent [19]

Reichner

[11] Patent Number: 5,246,600
[45] Date of Patent: Sep. 21, 1993

[54] CENTRIFUGAL VACUUM FILTER

[76] Inventor: Thomas W. Reichner, 1826 Warriors Rd., Pittsburgh, Pa. 15205

[21] Appl. No.: 825,637

[22] Filed: Jan. 24, 1992

[51] Int. Cl.$^5$ ............................................. B01D 24/32
[52] U.S. Cl. ................................. 210/781; 210/780; 210/360.1; 210/364; 210/367; 210/374; 210/380.1; 210/396; 494/36
[58] Field of Search ...................... 210/360.1, 364, 365, 210/367, 369, 372, 374, 376, 380.1, 396, 780, 781; 494/36

[56] References Cited

U.S. PATENT DOCUMENTS

| | | | |
|---|---|---|---|
| 3,585,132 | 6/1971 | Ruegg | 210/376 |
| 3,794,166 | 2/1974 | Converse et al. | 210/376 |
| 4,101,421 | 7/1978 | Hultsch. | |
| 4,790,806 | 12/1988 | High | 494/26 |
| 4,826,608 | 5/1989 | Kopper | 210/781 |
| 4,975,188 | 12/1990 | Brunsell et al. | 210/360.1 |
| 4,997,575 | 3/1991 | Hultsch | 210/741 |

Primary Examiner—Robert A. Dawson
Assistant Examiner—David Reifsnyder
Attorney, Agent, or Firm—Armstrong, Westerman, Hattori, McLeland & Naughton

[57] ABSTRACT

A drum vacuum filter is shown which draws-in and radially outwardly projects the liquid content of a slurry or the like while the latter is advanced vertically along a passageway defined between a cylindrical rotating filter and a rotating drum wall, the latter of which collects and advances the solid material content of the slurry downwardly along the passageway for delivery and, as facilitated by a scroll scraper extending therealong. The liquid content is drawn under vacuum pressure induced force by a series of spaced-apart flutes or plates disposed along the exterior of the rotating filter, and radially or transversely outwardly with respect to the filter for segregated delivery with respect to the solid material content of the slurry or changed-in liquid.

15 Claims, 3 Drawing Sheets

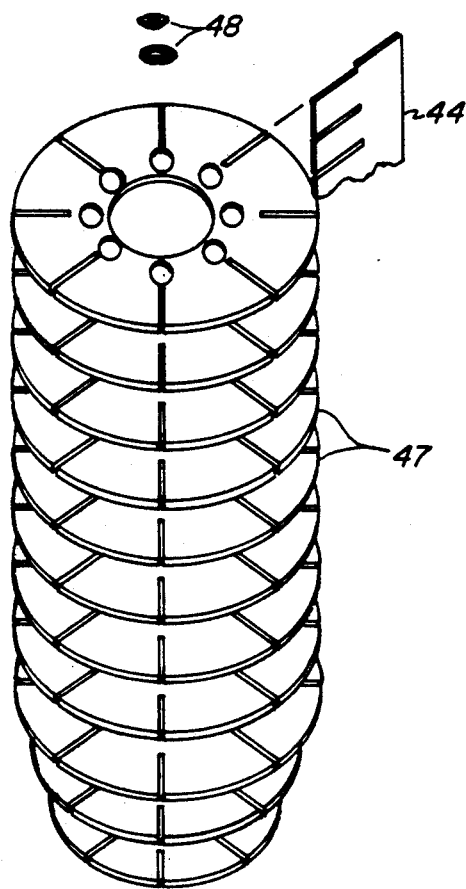

CENTRIFUGAL VACUUM FILTER

FIELD OF THE INVENTION

This invention relates to separating out of the solid material content from the liquid content of a flowable material and particularly, to the clarification or filtering of slurries and the like. It combines the best capabilities of a filtering centrifuge with a drum vacuum filter to enable a high speed and throughput separation of the liquid from the solid content of a flowable charge material.

BACKGROUND OF THE INVENTION

Present day centrifuge apparatus is highly complex in its construction and operation, expensive in its original cost and maintenance, is difficult to service and lacks flexibility as to its utilization.

I found that there is a need for a centrifuge which will be relatively inexpensive to construct, operate and maintain, relatively simple but energy saving and highly efficient in its operation, flexible in its utilization and substantially fully adaptable to varying needs of industry in separating-out solid materials from a liquid. The need is now especially acute due to present day environmental waste disposal restrictions and requirements.

OBJECTS OF THE INVENTION

It has been an object of my invention to develop a new and improved approach to the separation of materials and especially those, such as liquids and solids of a sludge or the like.

Another object has been to develop an improved type of separating operation in which a fluid-like stream of charge material is progressively advanced along a flow chamber whose inner reaches serve to inwardly separate and axially advance the solids retained on or adjacent an entry surface of a filter medium, and whose outer reaches serve to radially or transversely outwardly separate and advance the liquid content of the material charged.

Another object has been to effect a progressive separation of the liquid and the solid content of a contaminated fluid as the fluid is advanced along a longitudinal axis of rotational movement.

A further object has been to develop an improved filter type of centrifuge.

A still further object has been to employ a rotating permeable outer wall for collecting, vacuum screening or passing, and then forcibly radially outwardly moving a clarified liquid, under rotationally induced force or pressure, while employing an inner wall for collecting and longitudinally advancing solid material in a separated-out relation which is shown as a substantially parallel longitudinally advancing relation with respect to the liquid after the liquid material has reached a radial outward position within the apparatus.

SUMMARY OF THE INVENTION

In carrying out my invention, I have shown a contaminated liquid, sludge or the liquid-like or flowable material having a content of solid particulate materials which are to be separated out on the basis of the ability of one material or substance to penetrate and pass through a surrounding or cylindrical permeable wall and the tendency of another, solid or particulate material or substance to collect, cake or resist penetration into and through the same wall. In this connection, I have found that optimum results are attained by the use of a self-supporting permeable encircling wall, such as a ceramic filter tube. However, depending on the type of material being processed, for example, coal tailings, a wall using a fine mesh type or an articulated, tubular or cylindrically shaped screen may be used. The outer permeable tubing wall in the illustrated embodiment of my invention serves to pass the more liquid or less dense material therethrough while it is being rotated, and a radial outward drawing-through vacuum is maintained, as accomplished by centrifugal force generated by the rotation of a group or series of radially outwardly extending, vacuum chamber defining, spaced-apart, parallel discs or plates that are mounted on or extend from an outer side of the filter tube or cylindrical wall.

An inwardly spaced tubular, longitudinally extending, solid or non-permeable wall that defines a longitudinal, somewhat narrow longitudinal passageway with the outer filter tube or cylindrical wall, serves to collect and with its continuous spiraled, convoluted or screwlike scraper blade or scroll, to advance the solid material content of an axially or vertically fedin, flowable material conglomerate along the inner wall and separately discharge such solid ingredient or cake-like content from an opposite or lower end of the apparatus. The outermost reaches of the discs have a slight inwardly spaced relation with a cylindrical, outermost enclosing housing wall of the device to define a second passageway for separately delivering the liquid content of the charge material that has penetrated or moved through the filter tube and that may then be separately delivered from the lower end of the apparatus.

Both the filter wall and the inwardly spaced, through passageway defining solid or dense material collecting inner wall are rotated, but the outer or filter wall is rotated at a faster centrifugal and vacuum force developing rate and the inner, sludge or solid material collecting wall is rotated at a slower speed or rate such that its encircling scroll-like or spinal scraper blade will advance the solid material along the innermost wall and keep the inside portion of the outer tubular filter wall relatively clear.

The power requirements are such that a single drive motor may be used having a pair of different size belt sheaves or chain sprockets for rotating both the filter tubing wall and the innermost solid or cake material collecting wall.

My device or apparatus, in one sense, serves to efficiently wash or separate-out clean liquid from, for example, a slurry and thus, to concentrate suspended solid tailings, middlings or substances of different densities from slurries, etc. It works as a centrifuge and is highly adaptable by reason of its relatively simple construction and operation in effectively and, with a minimum of energy, continuously separating out different density materials. It employs a minimum of energy, is easy and inexpensive to maintain, and its operating parts are easily accessible. It can be used to separate-out flowable materials of different densities, liquid from solid materials and some solid materials of different densities. It is thus highly adaptable to various industrial and environmental needs. It, however, is especially efficient in separating fluids from solids. It is so constructed that outer tubes of different permeabilities may be substituted for most efficient different substance separation.

Figure 1:
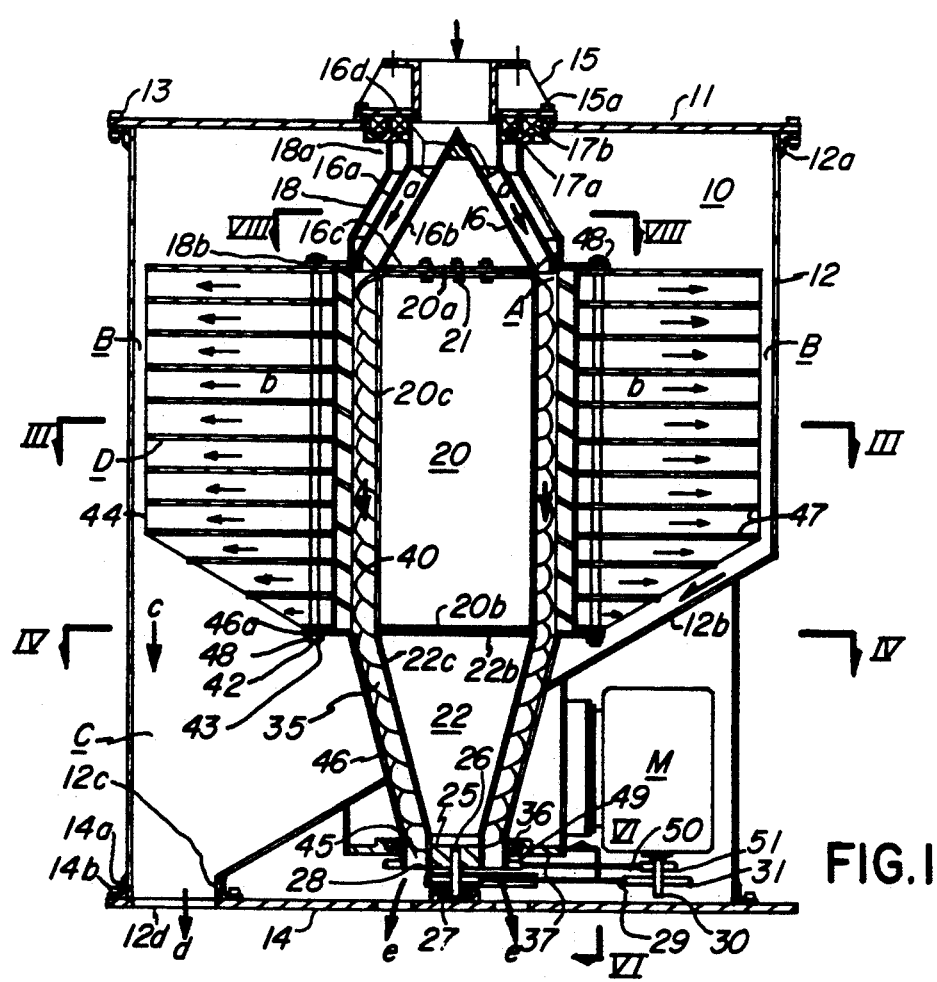
FIG. 1 is a vertical sectional view showing an apparatus or device constructed in accordance with my invention with arrows added to indicate flow paths.
Figure 8:
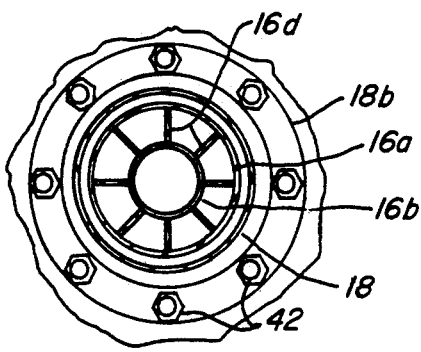

And, FIG. 8 is a fragmental horizontal section on the scale of and taken along the line VII—VIII of FIG. 1.

DETAILED DESCRIPTION OF THE ILLUSTRATED INVENTION

Referring to Figure representing an operating embodiment of my invention, I show a centrifugal filter apparatus that is constructed to be operated on a vertical axis wherein the flowable charge material (see arrows a of FIG. 1) to be treated is introduced substantially centrally and directly from a pipe, chute or other source in a connected or coupled manner such as to preclude drawing-in air therewith. As indicated, apparatus 10 is so constructed that it makes possible a continuous type of operation in which the material being charged or introduced may have its liquid and solid content continuously separated-out, and advanced in and discharged therefrom in a separated relation from its bottom end. The apparatus 10 operates on a self-cleaning basis, both due to the relatively high negative pressure force that may be developed and controlled by adjusting the speed of its rotating outer cylindrical filter wall, tubing or shell 40, and of its rotating concentric inner, solids collecting cylindrical wall, tubing or shell 20 which carries a mounted-on scroll scraper, or helix screw conveyor 35.

Figure 2:
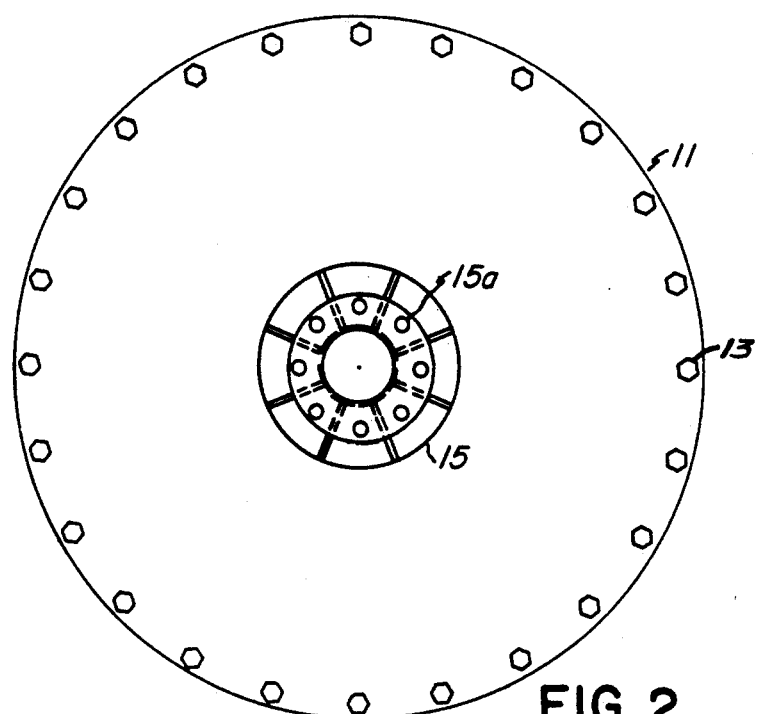
FIG. 2 is a top plan view on the same scale as and of the apparatus shown in FIG. 1.
Figure 4:
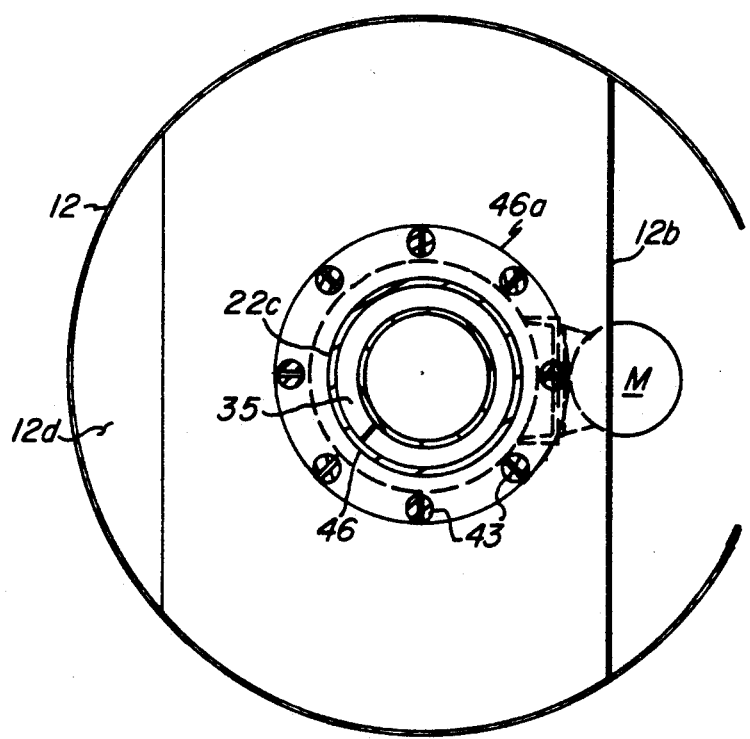
FIG. 4 is a horizontal section on the scale of and taken along the line IV—IV of FIG. I.

Referring to FIG. 1 and 2 of the drawings, I have shown a bolted-together enclosing housing or upright container 10 of sheet metal construction having a removable top lid or cover plate 11 secured, by bolt and nut assembles 13 to a top, angle-shaped flange 12a of a circular-shaped, vertical outer side wall or drum 12 that is also shown of sheet metal construction. A downwardly inwardly sloped bottom closure extension portion 12b of outer side wall 12 (see also FIG. 4) slopes towards an opposite side of such outer wall 12 to define a bottom delivery chute 12c that is secured at its open end by an encircling welded-on angle piece or collar 14a and bolt and nut assemblies 14b to a bottom closure plate 14.

The fluid or lower density portion of the entering charge material a is passed through a permeable column, cylinder or collar 40, and under vacuum pressure generated by its rotation, is then projected (see the arrows under centrifugal force, radial-transversely outwardly against the inside of the wall 12 and into a vertical side chamber B for discharge downwardly (see arrow c) into a bottom collecting chamber C. Exit port 12d that extends through the bottom closure wall or plate 14 delivers the liquid content of the charge material (see the arrow d).

As shown in Figure sludge-like or solid particle-contaminated, flowable charge material (see arrows a) is introduced into the device through a connecting collar 15 in an air sealed-off relation centrally through the top cover plate 11 of the apparatus, along a downwardly enlarged, cone-shaped, dual wall entry and support part 16. The upper end of the entry part 16 for the sludge or other charge material that is to be processed carries a dual bearing assembly 17 on which a centrally disposed and longitudinally extending rotating, cylindrical, innermost, closed off operating assembly or unit 20 is journaled for rotative movement.

The collar-like entry part 15 of the central assembly 20 is shown as having an inner, cone-shaped or downwardly-outwardly diverging flow chamber walls 16a and 16b along which the entering fluid-like charge material (see arrows is introduced into a central, liquid-solid separating chamber or vertical passageway A (see FIG. 1). The separating chamber A is shown defined between the outer side of the vertical wall of enclosed, rotatable, inner cylindrical member 20, and a permeable, longitudinally-extending, outer, cylindrical filter wall 40. The innermost cylindrical unit 20 is shown closed-off and strengthened at its upper end by its closure wall 20a and by a bottom closed-off end wall 20b that rests on a top closure wall 22b of a downwardly converging cone-shaped unit 22. The top wall 20a is shown secured by bolt and nut assemblies 21 to the wall 16c. Lower, downwardly converging, bottle-shaped end wall member 22 is closed-off at its lower end or neck by a supporting end plug 25 from which a short length drive shaft 26 extends. The shaft 26 is journaled at its lower end within a ring bearing assembly 27 that is mounted on the inside of the bottom closure plate 14. A belt pulley 28 (see also FIG. 7), or if desired, a chain sprocket (not shown) is secured on the shaft 26 for rotative drive by a belt 29, or if desired, a chain (not shown) and a pulley 31, or if desired, a sprocket (not shown) that is mounted on a drive shaft 30 of an electric motor M.

A continuous spiral scroll scraper blade or helical screw conveyor 35 is secured to and mounted on and extends along the full extent of outer side walls 20c, and 22c of the unit assembly 20, 22. The scraper 35 serves the dual purpose of keeping the inside surface of centrally-positioned, permeable, liquid-separating, cylindrical filter shell wall 40 cleaned-off and of advancing the of the charge material along the walls 20c and 22c to deliver it from the spacing between the spaced-apart inwardly sloped walls of the cone-shaped inner wall part 22 and the cone-shaped outer wall part 46 through a discharge or delivery open spout 45, (see the arrow e). As shown in FIG. 1, there is a slight passageway defining relation between the filter wall 40 and the solid wall 20c of the inner cylinder 20. However, as also shown, there is a closely spaced relation between the outer lower wall 46 and the screw conveyor 35 that is secured on the cone-shaped lower wall 22c.

The outer, rotating centrifugal assembly is shown in FIG. 1 as rotatably carried at its upper end by the cone-shaped or upwardly converging support member 18 that is journaled at its upper, collar-like end portion 18a within an outer race 17b of a dual bearing assembly. An inner race 17a journals an inner cone-shaped wall 16b. Assembly 16a (see FIG. 8) is attached to 16b by connecting struts 16d that, with the wall 16b, defines an entry passageway (see arrows of FIG. 1) for the incoming fluid material. This assembly is removably secured in position centrally on the top cover plate 11 of the container by bolts 15a that also serve to mount the connector input collar 15 on the plate 11.

Figure 3:
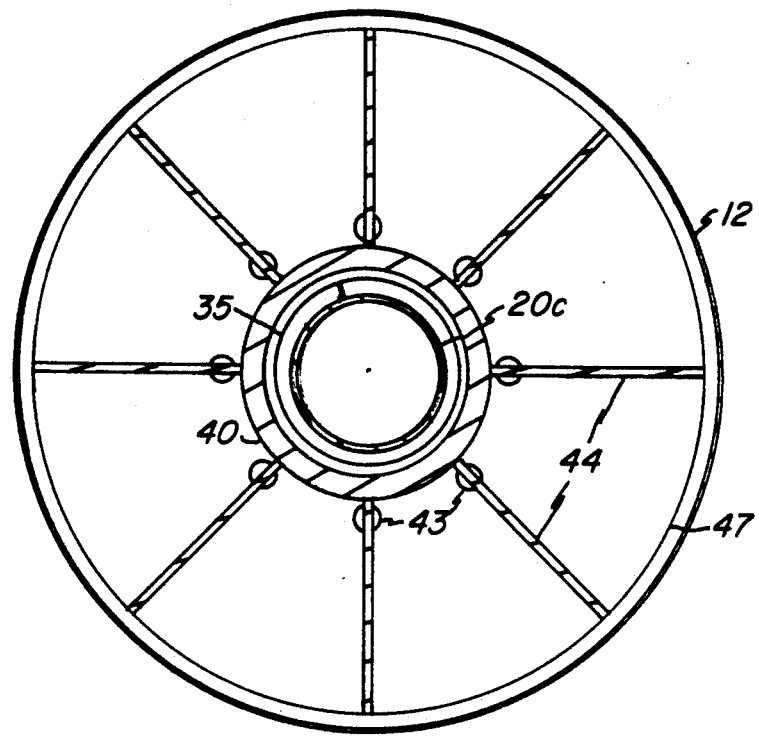
FIG. 3 is a horizontal section on the scale of and taken along the line III—III of FIG. 1.
Figure 5:
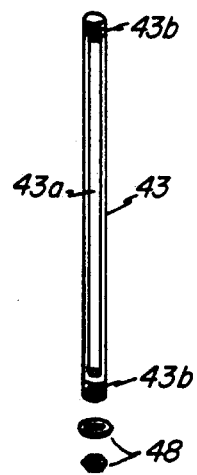
FIG. 5 is an exploded vertical view on the scale of FIG. I showing details of the construction and mounting of the entrifuqal plates or discs and flights of the device of FIG. 1 by the use of vertical spacer and turnbuckles.

The outer, separately rotating centrifugal assembly 40, as shown in FIGS. 1 and 3, is rotatably carried at its upper end by an encircling cone or flange 18b (see also FIG. 8) of a cone-shaped, downwardly-diverging support member 18 that is journaled at its upper, collar-like end portion within outer bearing assembly 17b. This outer assembly 17b as well as inner assembly 17a are removably secured in position centrally on the top cover plate 11 by bolts 15a that also serve to mount input collar 15 on the cover plate. Bottom flange 18b of the separately journaled part 18 serves (see also FIGS. 3 and 5) through the agency of a series of vertically extending bolt, nut and washer assemblies 42 (see FIG. 1) and horizontally slit struts or spacer pieces 44 to mount circular plates or discs 47 in an assembled vertically spaced relation to extend radially, transversely outwardly in a spaced operating relation with respect to the inner, rotating, scroll-carrying wall member or cylinder 20. As shown in FIG. 5, elongated bolts 43 of each assembly 42 are centrally slit at 43a along their lengths to receive and by-pass a horizontally slotted portion of each mounting tab of an associated spacer piece or strut 44. Also, as shown, each bolt 43 is threaded at its opposite ends 43b to receive a washer and nut assembly 48. Each bolt 43, see FIG. 1, is mounted between the lower flange 18b of the part 18 and an upper flange 46a of cone or funnel-shaped, downwardly converging wall member 46 for rotation therewith.

The lower or converging end of a cone-shaped rotating member 46 which supports and drives disc assembly D is journaled within a bearing assembly 36 (see FIG. 1) that is carried by a ring-shaped bottom end closure member 37. The bottom end of member 37, as shown, carries a driven pulley 49 that is connected by a drive belt 50 to a drive pulley 51 mounted on and driven by the drive or shaft 30 of motor M.

Figure 6:
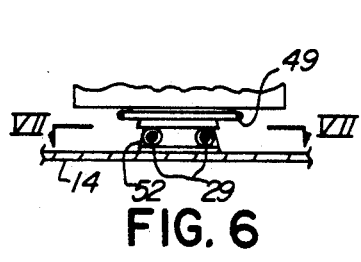
FIG. 6 is a fragmental vertical detail section taken along the line VI—VI of FIG. 1 showing a protecting cap and tube assembly for the belt and sprocket or pulley drive means for rotating the inner cylinder assembly as well as the outer, disc or plate assembly.
Figure 7:
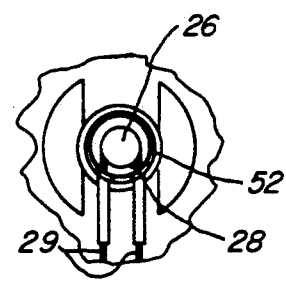
FIG. 7 is a horizontal fragmental section on the same scale as and taken along the line VII—VIII of FIG. 6.

The inner or solid material collecting unit 20 may be driven at a slightly slower speed than the outer or centrifugal, fluid separating out unit D of the centrifugal and vacuum or negative force generating assembly, by the same motor M. As shown, this is accomplished by different sizes or diameters of drive pulleys, such as 31 and 51. If a chain drive is to be employed, different sprocket diameters may be used. FIGS. 6 and 7 show a protective cover plate 52 for the motor driven pulley 28 which has a pair of tubular extensions for protecting the belt from falling solids.

The unit D, at its innermost or central periphery carries a suitable screening mesh or permeable cylinder 40 to, under centrifugal negative force induced, pass the liquid content of the charge material, such as of a sludge or a slurry therethrough into the horizontal spaces between the discs 47 from which the liquid is flung outwardly, (see arrows b of FIG. 1) into the vertical side space B that is provided between the outer edges of the plates or discs 47 and the wall 12 of the container. As shown by the arrows c, the fluid or liquid then flows downwardly into the bottom chamber C and out through the discharge port or opening 12d therein, see arrow d.

Using the scraper arrangement shown, no backwashing is required. Also by way of example, I have used a wide spacing shown for the vertical separating passageway between the inner and outer cylindrical walls of about $\frac{1}{4}$ to $\frac{3}{8}$ of an inch for processing coal tailings. The speed of rotation is flexible and may be adjusted to best suit the type of charge materials being processed. Also, the negative pressure developed and applied to the outer side of the permeable outer wall may be controlled by the speed of its rotative movement e.g. about 1000 rpm has been found to be suitable for coal tailings using a ceramic filter wall or tube. The filter wall may be of any suitable permeable material such as a wire or plastic screen. The speed of rotation of the inner cylinder wall may be slower, e.g. 900 rpm, since its rotation is employed to advance and scrape-off the cake and solid material that is being separated from the liquid content of the charge being introduced. Any conventional means may be employed to control the speed of the electric motor drives of the two rotating cylinders.

I claim:

1. A method of separating out the liquid from the solid material content of a contaminated fluid within a separating device which comprises, introducing the fluid material into one end of the device and along an elongated flow chamber while rotating an inner wall of the chamber in a material advancing spiral path and separately rotating a liquid permeable outer wall of the chamber, advancing the fluid material along the flow chamber while progressively removing its liquid content transversely-radially outwardly through the permeable outer wall under suction pressure applied to the outer wall, and progressively depositing the solid material on and along the rotating inner wall, and thereafter removing the liquid and the solid material content of the contaminated fluid in a segregated relation with respect to each other.

2. A method as defined in claim 1 wherein the liquid is thrown transversely outwardly from an outer side of the permeable outer wall.

3. A method as defined in claim 2 wherein the solid material content is advanced along the rotating inner wall and out of an opposite end of the device.

4. A method as defined in claim 2 wherein the permeable outer wall is rotated at faster rate than the inner wall and has a transversely outwardly extending longitudinally spaced-apart vacuum inducing disc and flight assembly projecting from an outer side of the permeable wall.

5. A method as defined in claim 1 wherein the inner and outer walls are rotated at differential speeds with respect to each other.

6. An apparatus for the liquid from the solid material content or a fluid charge material which comprises, a longitudinally extending closed-off inner wall and a permeable longitudinally extending outer wall in a passageway defining relatively closely spaced cooperating relation with respect to each other, means for rotating said outer wall with respect to said inner wall, a group of discs mounted in a transversely outwardly extending and longitudinally spaced-apart relation along an outer side of said outer wall, said discs defining a series of outwardly open and transversely extending vacuum chambers therebetween, means for rotating said outer wall to pull the liquid content of the material under vacuum pressure through said permeable outer wall while the solid material is deposited on said inner wall, means for advancing the solid material along said inner-wall to discharge it from the apparatus, and means for separately discharging the liquid from said vacuum chambers.

7. An apparatus as defined in claim 6 wherein s and outer walls extend vertically therealong, and an air sealed off inlet for the charge material is positioned at an upper end of the apparatus, and means for separately removing the liquid and solid materials from an opposite end of the apparatus.

8. An apparatus as defined in claim 6 wherein said inner wall defines a passageway along and with respect to said outer wall along which the solid material is advanced, and means carried by an outer side of said inner wall for advancing the solid material therealong within the apparatus to discharge it therefrom.

9. An apparatus as defined in claim 8 wherein means extends along said inner wall for advancing the solid material along a passageway defined between said inner and outer walls.

10. An apparatus as defined in claim 9 wherein said means for advancing the solid material is a scroll scraper mounted on and extending along said inner wall.

11. An apparatus as defined in claim 10 wherein, said inner wall has a closed-off upper portion of cylindrical shape positioned in a vertically extending relation and terminating at its lower end in a closed-off cone-shaped wall portion, said scraper extends in a vertically extending helical-shaped relation along the cylindrical and cone-shaped portions of said inner wall, said outer wall has a cylindrical upper portion that is permeable and that has a somewhat widely spaced relation with and along the upper cylindrical shaped portion of said inner wall and that terminates in a cone-shaped portion that defines a relatively closely spaced relation with respect to the portion of said scraper that extends along said cone-shaped portion of said inner wall to facilitate scraping-off of solid cake material from said outer wall.

12. An apparatus as defined in claim 8 wherein means is connected to rotate said inner wall and at a slower rte than the rotation of said outer wall.

13. An apparatus as defined in claim 10 wherein said means for rotating said inner and outer walls is a common motor operatively connected to both said walls.

14. An apparatus for separating the liquid from the solid content of fluid charge material which comprises, a processing container having a vertical outer enclosing wall, having an enclosed top end wall provided with means for introducing a solid containing liquid to be processed, and having a closed-off bottom wall provided with a port for separated-out liquid and a port for separated-out solids found in the sludge, an inner closed-off rotatably mounted cylindrical wall and an outer permeable cylindrical wall rotatably mounted to extend substantially centrally along and within said container, said inner and outer walls defining a vertically extending processing passageway between, motor means for rotating said inner and outer walls with respect to each other, drive connections between said motor means and said inner and outer walls for rotating said outer wall at a relatively high speed and for rotating said inner wall at a relatively slower speed, means carried by outer reaches of said outer wall for developing and applying centrifugally induced force to an outer side of said permeable outer wall for drawing the liquid content of the charge material through said permeable outer wall and projecting it radially towards the inside of said enclosing wall of the container, means carried by said inner wall for advancing the solid content of the charge material downwardly within the container, a port in said bottom wall of the container for discharging the solid material from the container, and a second port in said bottom wall of the container for separately discharging the liquid content of the charge material therefrom.

15. An apparatus as defined in claim 14 wherein said motor means is mounted on said container and has separate drive connections to said inner and said outer walls, and said means for introducing the solid containing liquid is an atmospheric air-sealing-off collar.

* * * * *